United States Patent
Wiseman

(10) Patent No.: US 9,239,923 B2
(45) Date of Patent: Jan. 19, 2016

(54) PROTECTION OF COMPUTER SYSTEM

(75) Inventor: Simon R. Wiseman, Malvern (GB)

(73) Assignee: QINETIQ LIMITED (GB)

( * ) Notice: Subject to any disclaimer, the term of this patent is extended or adjusted under 35 U.S.C. 154(b) by 29 days.

(21) Appl. No.: 13/140,087

(22) PCT Filed: Dec. 15, 2009

(86) PCT No.: PCT/GB2009/002890
§ 371 (c)(1),
(2), (4) Date: Jun. 16, 2011

(87) PCT Pub. No.: WO2010/070280
PCT Pub. Date: Jun. 24, 2010

(65) Prior Publication Data
US 2011/0252473 A1    Oct. 13, 2011

(30) Foreign Application Priority Data

Dec. 19, 2008 (GB) .................................. 0823189.6

(51) Int. Cl.
G06F 21/00 (2013.01)
G06F 21/56 (2013.01)

(52) U.S. Cl.
CPC ............ G06F 21/564 (2013.01); G06F 21/562 (2013.01)

(58) Field of Classification Search
CPC .... G06F 21/562; G06F 21/564; G06F 21/565
USPC ........................................... 726/22; 711/154
See application file for complete search history.

(56) References Cited

U.S. PATENT DOCUMENTS 5,940,233 A * 8/1999 Malone, Sr. ..... G11B 20/10055
360/48
5,999,723 A * 12/1999 Nachenberg .................... 703/22
(Continued)

FOREIGN PATENT DOCUMENTS

EP        1 560 112      8/2005
GB        2427048        12/2006
(Continued)

OTHER PUBLICATIONS

McDaniel et al., "Content Based File Type Detection Algorithms", Proceedings of the 36th Hawaii International Conference on Systems Sciences, 2002, IEEE.

Primary Examiner — Izunna Okeke
Assistant Examiner — Ali Shayanfar
(74) Attorney, Agent, or Firm — McDonnell Boehnen Hulbert & Berghoff LLP

(57) ABSTRACT

Protection of a computer system (104) against attacks using malformed files is applied to an application (106) configured to process files of a predefined Headerless format indicated by a Characteristic pattern of bytes. An incoming file's Characteristic pattern is checked by comparing its leading bytes with Characteristic patterns. If its leading bytes have such a pattern, the file (100) is subjected to a full content check; the file is discarded (100) if it lacks such a pattern or has contents considered damaging. A file is checked regarding suitability for further processing by comparing its leading bytes with the Characteristic pattern of the predefined Headerless format. A full content check of the file may also be carried out. The application (106) is permitted to process files having the Characteristic pattern of the predefined Headerless format and appropriate file contents. The method can deal with ZIP files (b) etc. starting with redundant data b1 even if polymorphic, provided that the file is not potentially damaging.

22 Claims, 6 Drawing Sheets

(56) References Cited

U.S. PATENT DOCUMENTS

| | | | |
|---|---|---|---|
| 6,292,810 B1* | 9/2001 | Richards | G06F 17/246 707/999.1 |
| 2002/0118476 A1* | 8/2002 | Malone, Sr. | 360/48 |
| 2004/0255162 A1 | 12/2004 | Kim et al. | |
| 2005/0273708 A1* | 12/2005 | Motyka et al. | 715/515 |
| 2006/0041840 A1* | 2/2006 | Blair et al. | 715/513 |
| 2008/0010538 A1* | 1/2008 | Satish et al. | 714/38 |
| 2008/0134333 A1* | 6/2008 | Shipp | 726/23 |
| 2008/0141373 A1* | 6/2008 | Fossen | G06F 21/564 726/23 |
| 2008/0209138 A1* | 8/2008 | Sheldon | G06F 21/6218 711/154 |
| 2010/0122313 A1* | 5/2010 | Ivgi | 726/1 |
| 2010/0257127 A1* | 10/2010 | Owens | 706/12 |
| 2011/0047618 A1* | 2/2011 | Evans | G06F 21/566 726/23 |

FOREIGN PATENT DOCUMENTS

| | | |
|---|---|---|
| WO | WO 2005/122004 | 12/2005 |
| WO | WO 2008/068459 | 6/2008 |

* cited by examiner

PROTECTION OF COMPUTER SYSTEM

FIELD OF THE INVENTION

This invention relates to a method, an apparatus and computer software for protection of computer systems against attacks mounted by using malformed documents or files, and more particularly (although not exclusively) against disguised attack implemented using polymorphic files.

BACKGROUND OF THE INVENTION

Computer systems are open to attack because conventional software applications can mishandle malformed documents. Application software may be written in such a way that it properly handles documents that it has created, but it may be induced to mishandle a malformed document designed to achieve this: such an application may for example exhibit unexpected behaviour, such as interpreting the malformed document's data as code that the application executes.

It is known to defend against attacks implemented by malformed documents by checking incoming documents received by a sensitive computer system and possibly from a potential attacker. Checking ascertains that an incoming document is correctly formed and consists of constructs that vulnerable applications running on the computer system are able to handle properly. Documents found to contain malformed constructs are blocked so they do not reach vulnerable applications.

Full content checking by a full checker may involve performing a complete check of the file's data against the file's format specification: for example, to ensure that an Adobe PDF document fully meets the PDF file format's specification, every byte of the file is compared with that specification. Alternatively, only a partial check against a file's format specification may be performed, but it can still be referred to as a full content check: for example, a PDF document may be checked to ensure that it has correct main structures of pages etc, but i without checking every byte that makes up a page description. A full checker may therefore perform a complete or partial check of a file's data against the relevant file format specification, and then it may also enforce some additional constraints: for example, there may be an additional check to make sure a PDF document does not contain any JavaScript code. In order to impose an additional constraint where a partial check is conducted, the partial check must cover appropriate parts of the relevant file format specification in enough detail to enforce the constraint.

Document checking pays regard to a document's file format. Most file formats are characterised by a document's first few bytes which have a Characteristic pattern: these can be referred to as Characteristic Header formats. When an application handles a document as a file with Characteristic Header file format, it opens the file and examines the file's first few bytes in order to determine the file's likely format. If the format determined in this way is one that the application is configured for, the application then proceeds to deal with the data in an appropriate way. Otherwise, i.e. if the format is not appropriate, the application stops trying to deal with the data and reports an error to its user.

For example, upon opening a file, Microsoft Word looks at the file's first few bytes in order to determine whether the file is in native Word 97 format, Word XML format, Rich Text format or plain text. It then proceeds to interpret the file's other data appropriately for that format.

For Characteristic Header file formats, content checkers are known which examine a file's first few bytes in order to deduce how the file's data will be treated by software applications and so apply checks appropriate for those applications.

Some file formats (referred to as "Headerless") do not begin with Characteristic patterns, i.e. in the first few bytes. A software application might be required to search throughout a file having a Headerless file format in order to find a Characteristic pattern that indicates the start of data relevant to the application; if so, the application would ignore all data before the Characteristic pattern. The Zip archive format for Zip files is an example of a Headerless file format that is in widespread use: a Zip file has redundant data before and after its Zip data. Applications such as WinZip ignore data found at the start of a Zip file and instead search through the file for some characteristic bytes indicating that Zip data is present.

Headerless file formats present conventional content checkers with a problem. A content checker that intercepts a file passed to a sensitive computer system must determine the file's format in order to apply appropriate checks. If the computer system uses only Characteristic Header file formats, this would be a quick process as only the first few bytes of the file would need to be inspected; but if Headerless file formats are in use, then a content checker will need to search through all data in a file to ascertain whether or not the file contains any such format's Characteristic pattern: this can be time consuming.

A common means of speeding up the process of checking files with Headerless file formats is to rely on a file's name extension to determine its format. For example, a file with a name ending in ".zip" is considered to be a Zip file and so an application will open it as such. A content checker could use the same strategy. Having ascertained the file's type from its file extension, the content checker could proceed to check that the file's format complies with an appropriate format specification. In the case of a Zip file, the content checker would then search for a Characteristic pattern of Zip archive data and check that this pattern is correct. Files in other formats are checked against their respective format specifications: this avoids wasting time searching for Zip data.

Unfortunately, the strategy of relying on a file name extension is a poor one for a content checker. This is because it is not difficult to change the file name extension after the file has been checked, and it is possible for a file to conform to both the specification of a Characteristic Header format and a Headerless file format, or even to both of two different Headerless file formats: such files are referred to as "polymorphic". A polymorphic file can be opened with equal success by applications that handle the file's different file formats. For example, it is possible for a file to be a valid JPEG/JFIF image file and a valid Zip archive file: such a file starts with the Characteristic pattern of a JPEG/JFIF file and contains Zip archive data within the body of the image file. For this reason a content checker needs to search for characteristic bytes indicating the presence of a Headerless file format even though a file has a valid Characteristic Header format. This means a simple approach to content checking will be relatively slow.

A malformed Headerless format file that starts with redundant data will normally be blocked by a conventional content checker of the kind which searches a file's contents in their entirety to find a format's Characteristic pattern, unless the file is polymorphic. On recognising a Characteristic pattern, a conventional content checker checks a file's content, and if it is acceptable, passes the file on for processing by a sensitive computer system which it is protecting. However, this does not provide a check for a possible additional format which the file also matches. Consequently, an application running on the computer system may receive a file checked as regards beginning with a recognised Characteristic pattern, but may then open that file as if it were in a different format: this results in the application interpreting the file's data in a way that has not been checked and which may be damaging.

SUMMARY OF THE INVENTION

It is an object of this invention to provide an alternative approach to content checking.

The present invention provides a method of protection of a computer system, the method having the steps of:
  (a) providing the computer system with an application for processing incoming files of a predefined Headerless format having a Characteristic pattern in a prearranged file location,
  (b) ascertaining an incoming file's Characteristic pattern from bytes of the file,
  (c) determining whether or not the file has contents that are acceptable when interpreted in accordance with a file format specification associated with its Characteristic pattern,
  (d) allowing processing of the file by the computer system if the file has acceptable content,
  (e) checking an incoming file allowed for processing and having Headerless format by comparing bytes of the file with the Characteristic pattern of the predefined Headerless format, and
  (f) disallowing processing by the application if the file does not have the Characteristic pattern of the predefined Headerless format in the prearranged file location.

The invention provides the advantage that it enables files with Headerless formats to be checked for content and processed in a similar way to files with Characteristic Header formats. In a preferred embodiment, it provides the advantage of enabling a polymorphic file to be checked for content and processed in the same way as a Headerless format file having a single format, i.e. a non-polymorphic file.

The method of the invention may implement step (b) of ascertaining an incoming file's Characteristic pattern externally of the computer system and steps (e) and (f) of checking an incoming file allowed for processing and disallowing processing by the application by means of computer software running on the computer system. It may implement step (d) of ascertaining an incoming file's Characteristic pattern by comparing leading bytes of the file with each of a set of Characteristic patterns. Step (f) may not disallow the application to process a Headerless file beginning with redundant data irrespective of whether or not the file is polymorphic.

In another aspect, the present invention provides a method of protection of a computer system, the method having the steps of:
  (a) providing the computer system with an application for processing incoming files of a predefined Headerless format having a Characteristic pattern not located at the beginning of the file,
  (b) allowing processing of an incoming file by the computer system if the file does not begin with a Characteristic pattern,
  (c) checking for the Characteristic pattern of the predefined Headerless format in an incoming file allowed for processing, and
  (d) disallowing processing by the application if the file does not have the Characteristic pattern of the predefined Headerless format.

In a further aspect, the present invention provides a protected computer system incorporating:
  (a) an application for processing incoming files of a predefined Headerless format having a Characteristic pattern in a prearranged file location,
  (b) a first checking means for:
    i. ascertaining an incoming file's Characteristic pattern from bytes of the file,
    ii. determining whether or not the file has contents that are acceptable when interpreted in accordance with a file format specification associated with its Characteristic pattern,
    iii. allowing processing of the file by the computer system if the file has acceptable content,
  (c) a second checking means for:
    i. checking an incoming file allowed for processing and having Headerless format by comparing bytes of the file with the Characteristic pattern of the predefined Headerless format, and
    ii. disallowing processing by the application if the file does not have the Characteristic pattern of the predefined Headerless format in the prearranged file location.

In another further aspect, the present invention provides a protected computer system incorporating:
  (a) an application for processing incoming files of a predefined Headerless format having a Characteristic pattern not located at the beginning of the file,
  (b) a first checking means for:
    i. determining whether or not the file begins with a Characteristic pattern,
    ii. allowing processing of the file by the computer system if the file does not begin with a Characteristic pattern,
  (c) a second checking means for:
    i. checking for the Characteristic pattern of the predefined Headerless format in an incoming file allowed for processing, and
    ii. disallowing processing by the application if the file does not have the Characteristic pattern of the predefined Headerless format.

In an alternative aspect, the present invention provides a computer software product comprising a computer readable medium containing computer readable instructions for providing to a computer system, the computer system having an application for processing incoming files of a predefined Headerless format having a Characteristic pattern in a prearranged file location, wherein the computer readable instructions provide a means for controlling the computer system to:
  (a) ascertain an incoming file's Characteristic pattern from bytes of the file,
  (b) determine whether or not the file has contents that are acceptable when interpreted in accordance with a file format specification associated with its Characteristic pattern,
  (c) allow processing of the file by the computer system if the file has acceptable content,
  (d) check an incoming file allowed for processing and having Headerless format by comparing bytes of the file with the Characteristic pattern of the predefined Headerless format, and
  (e) disallow processing by the application if the file does not have the Characteristic pattern of the predefined Headerless format in the prearranged file location.

In a further alternative aspect, the present invention provides a computer software product comprising a computer readable medium containing computer readable instructions for providing to a computer system, the computer system having an application for processing incoming files of a predefined Headerless format having a Characteristic pattern, wherein the computer readable instructions provide a means for controlling the computer system to:

(a) allow processing of an incoming file by the computer system if the file does not begin with a Characteristic pattern, (b) check for the Characteristic pattern of the predefined Headerless format in an incoming file allowed for processing, and (c) disallow processing by the application if the file does not have the Characteristic pattern of the predefined Headerless format.

DESCRIPTION OF THE DRAWINGS

In order that the invention might be more fully understood, embodiments thereof will now be described, by way of example only, with reference to the accompanying drawings, in which.

DESCRIPTION OF THE INVENTION

Figure 1:
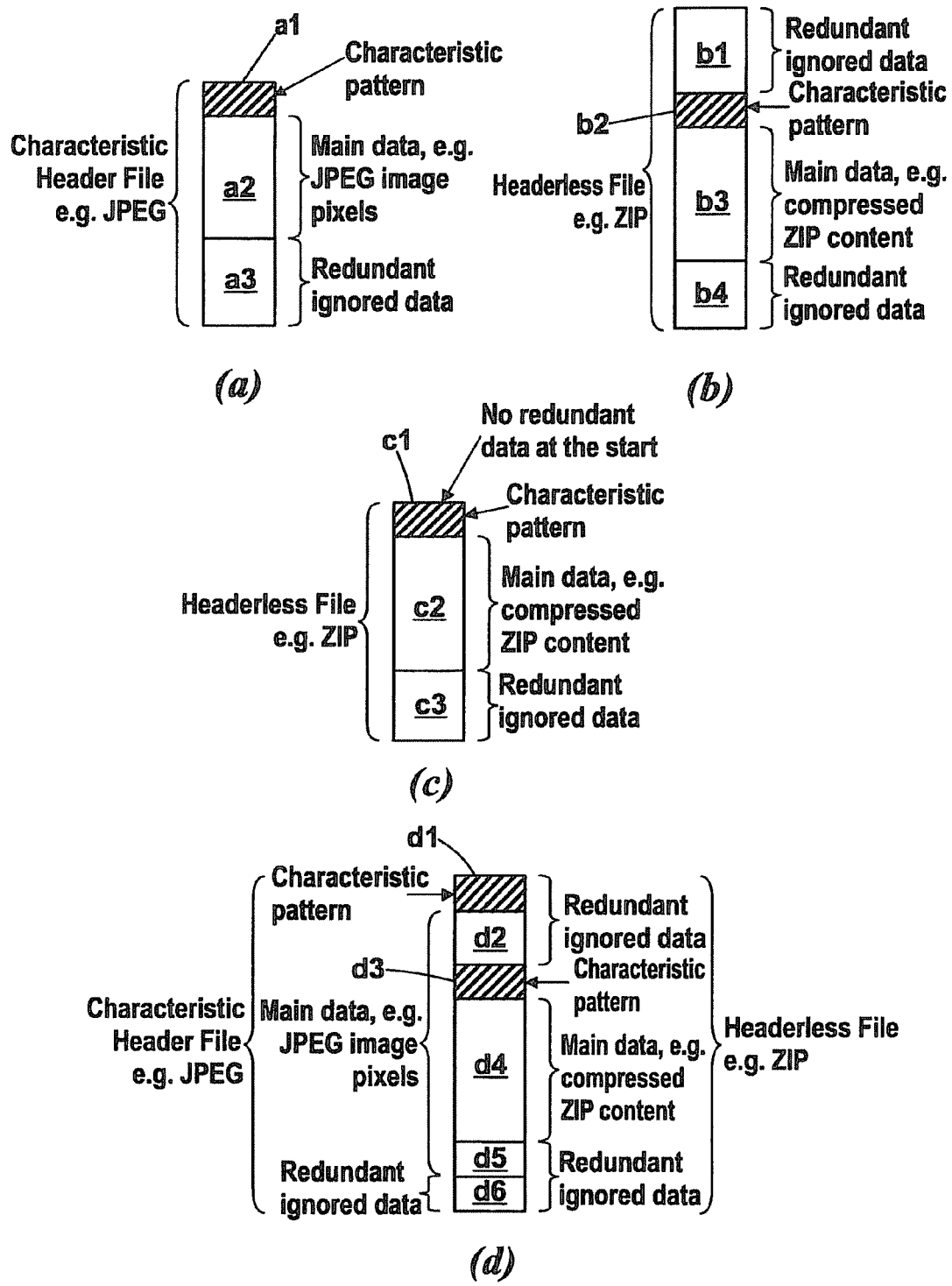
FIG. 1 is a schematic diagram illustrating four different file formats at (a) to (d) respectively.

Referring to FIG. 1, (a) is a conventional file format for a Characteristic Header file: it has a Characteristic pattern a1 indicated by diagonal shading, and the Characteristic pattern appears at the start of the file in its header. The Characteristic pattern a1 is followed by the file's main data a2, which in some cases may in turn be followed by redundant data a3 to be ignored when processing the file.

A second file format (b) is for a Headerless File: this format begins with redundant data b1. The redundant data b1 is followed by a Characteristic pattern b2 indicated by diagonal shading, which in turn is followed by the file's main data b3, which in this example is compressed Zip data. The main data b3 is in turn followed by more redundant data b4. Consequently, the Characteristic pattern b2 that heralds the start of the main data b3 is now placed part way through the file, and data b1 and b4 preceding and following the pattern b2 is ignored in processing.

Redundant data b1 at the beginning of a Headerless file format may be omitted: this is shown in a third file format (c), which is also a Headerless file format. In this case the file begins with a Characteristic pattern c1 indicated by diagonal shading, which is followed by the file's main data c2 itself followed by redundant data c3. Consequently, the Characteristic pattern c1 that heralds the start of the main data c2 is now at the start of the file, and data c3 following the data c2 is ignored. In cases such as this, a file lacks any leading redundant ignored data, and the file resembles a Characteristic Header file. Most Zip files are of this form, ie. they start with the Characteristic pattern c1 even though in general they may start with redundant data as at b1 in (b).

A polymorphic file format (d) has a Characteristic Header format such as JPEG indicated on the drawing's left hand side, together with a Headerless format such as Zip indicated on the drawing's right hand side. It begins with a Characteristic pattern d1 indicated by diagonal shading and indicating a JPEG file: this is followed by data sections d2 to d6, of which sections d2 to d5 will be treated as main JPEG data such as image pixels by an application processing the file as a JPEG file. Such an application will treat data section d6 as redundant data to be ignored.

However, an application processing the file format (d) as a Headerless format Zip file will ignore the Characteristic pattern d1 and data section d2. It will examine data section d3 indicated by diagonal shading to see whether or not it is a Characteristic pattern for a Zip file: if so, it will process data section d4 as main data, i.e. compressed Zip content, and treat data sections d5 and d6 as redundant data to be ignored.

A polymorphic file gives rise to a problem that a conventional checker will only check to see whether or not it begins with a Characteristic pattern indicating an acceptable file format; the checker will allow a polymorphic file to pass to a computer system protected by the checker if the file has such a pattern, even if it also has a second format which is different to the acceptable format. An application running on the protected computer system may then open the file as if it were in the second format, in which case it will interpret the file's data in a way that has not been checked and which might be damaging. In the present example, the polymorphic file format (d) matches both a JPEG Characteristic Header format indicated by Characteristic pattern d1 and also a Zip Headerless file format indicated by Characteristic pattern d3. A conventional checker will pass such a file format as a JPEG file, but an application configured for Zip files will process it as a Zip file—which has not been checked: the invention seeks to avoid this efficiently.

Figure 2:
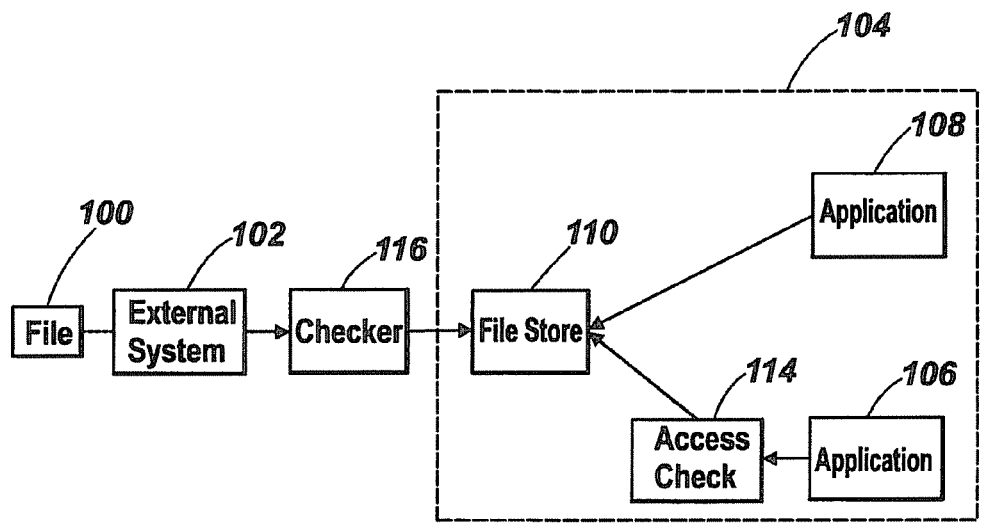
FIG. 2 is a schematic block diagram of a computer system which is protected in accordance with the invention.

Referring to now also to FIG. 2, a file 100 is to be sent by an external computer system 102 to a protected sensitive computer system 104 indicated within chain lines for processing by one of two software applications 106 and 108. The protected system 104 has a file store 110 linked directly to one application 108 by a direct connection 112 and via an access check function 114 to the other application 106. The applications 106 and 108 are configured to deal with Headerless file formats (H.less) and Characteristic Header file formats (Ch.H) respectively.

A typical external system 102 may be a network of computers; the applications 106 and 108 are software running on a user's computer and the access check function 114 is software that gets hooked into that computer's operating system in this example. The file store 110 is a computer's disk or a standard server on a local area network (LAN).

In order to send the file 100 to the protected computer system 104, the external system 102 first passes the file to a content checker 116. The checker 116 examines the first few bytes of the file 100 and checks to see whether or not they have a Characteristic pattern c1 or a1 indicating a file format which either application 106 or application 108 is configured to deal with; i.e. Headerless file format or Characteristic Header file format respectively. If the first few bytes of the file 100 have such a pattern, the file is checked in full to ascertain whether or not it is acceptable for passing into the file store 110; if the bytes do not have such a pattern, or the file contents are found to be damaging, the file 100 fails the check and is discarded by the checker 116. File contents are determined to be damaging by known checks for macros, viruses etc. The checker 116 may be implemented in software running on a separate computer in a guard role, or it may be implemented in firmware or logic.

As indicated by the direct connection 112, the application 108 is configured to deal with a Characteristic Header file format a1, and it is allowed to operate normally: i.e. it accesses the file store 110 directly as it would in a conventional computer system not modified to implement the invention. The application 106 is configured to deal with a Headerless file formats (b) and (c), i.e. a format of the kind which begins with redundant data b1 or a Characteristic pattern c1. It contains modified instructions which constrain it to access the file store 110 only indirectly, i.e. through the access check function 114. The access check function 114 checks that any file to be accessed by the application 106 is safe for such access, in that the file begins with Characteristic pattern c1; if the file does begin with Characteristic pattern c1, the access check function 114 allows the application 106 access to the file. If the access check fails, i.e. if the file does not begin with Characteristic pattern c1 the access check function 114 causes the application's file access attempt to fail, thus preventing the application 106 from accessing the file. The access check function 114 therefore allows the application 106 to deal with Headerless file format (c) but not (b), whereas in the absence of the access check function 114, the application 106 would deal with both formats (b) and (c).

Figure 3:
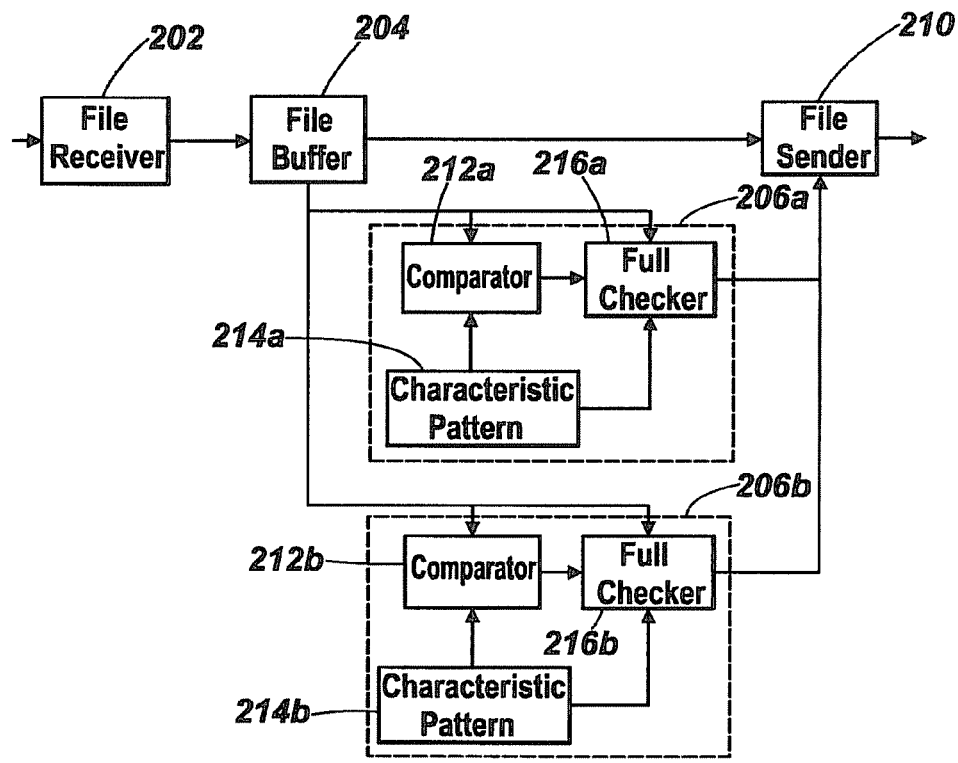
FIG. 3 is a block diagram of content checker functionality incorporated in FIG. 2.

Referring now also to FIG. 3, the functionality of the content checker 116 is shown in more detail. The content checker 116 includes a file receiver 202 which accepts files from the external system 102. The file receiver 202 passes files one at a time into a file buffer 204. Once the file buffer 204 contains a file, it is examined by a number of content checker modules referred to collectively and generally as 206, two content checker modules 206a and 206b being shown each indicated within chain lines. There is a respective content checker module 206 for each file format that the protected system 104 can accept, so each content checker module 206 handles a different file format. Each of the content checker modules 206 has the function of deciding whether or not to allow admission to the protected computer system 104 to a file having the format associated with the respective module: if such admission is allowable, the content checker module 206 associated with the relevant file format outputs a command which results in a copy of the file being sent from the file buffer 204 via a line 208 to file sender 210, and then from the file sender 210 to the protected computer system 104, where it is placed in the file store 110.

Each content checker module 206 contains a comparator 212 which compares the first few bytes of a file in the file buffer 204 against a stored Characteristic pattern 214: for a typical file the bytes compared will be the first few bytes, but the bytes could be any relatively small number of bytes (i.e. relative to the file's total number of bytes) in a known location in the file which are addressable without scanning the whole file: any known fixed offset relative to the file start or end is acceptable for reading using a Random Access file store. However, if a file is streamed across a network, it is expected that the first bytes will arrive first, and if they are Characteristic pattern bytes processing may begin before the file has arrived in full.

The output of the comparator 212 provides an input to a full checker 216 which carries out full content checking. As has been said, and for the purposes of this specification, a full content check may be a complete check of a file's data against that file's format specification, or it may be a partial check of a file's page main structures etc.: there may also be additional constraints, e.g. for presence/absence of JavaScript code. If the input to the full checker 216 indicates that the stored Characteristic pattern matches the first few bytes of the file, the full checker 216 examines the whole file in the file buffer 204. The full checker 216 produces an output which is the content checker module's overall output: the output is routed as an input to the file sender 210, informing the file sender 210 as to whether or not the file should be copied to the file store 110 of the protected system 104. The overall outputs of all the content checker modules 206a, 206b etc. are combined on to a bus 218 connected as an input to the file sender 210. If the file in the file buffer 204 is found acceptable by the full checker 216, that module outputs an admit signal on to the bus 218 instructing the file sender 210 to allow the file to be copied to the file store 110 of the protected system 104. If the file in the file buffer 204 is not acceptable, then no admit signal appears on the bus 218; consequently the file sender 210 is not instructed to allow the file to be copied to the file store 110 of the protected system 104, and the file is discarded from the file buffer 204.

Figure 4:
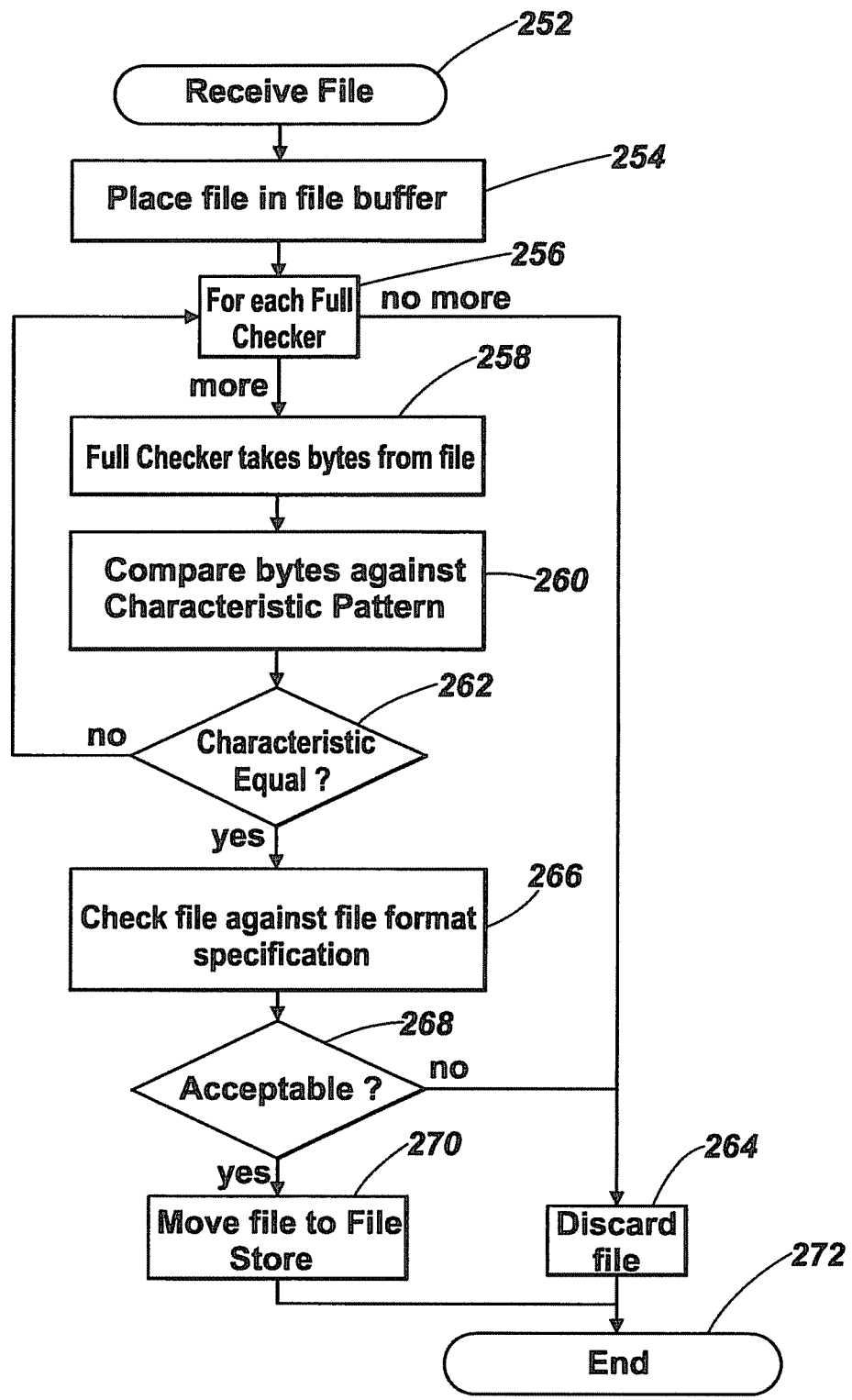
FIG. 4 is a flow diagram illustrating operation of the content checker of FIG. 3.

Referring now also to FIG. 4, a flow diagram illustrates the operation 250 of the content checker 116. At 252, the file receiver 202 receives a file and at 254 places it in the file buffer 204. A first comparator 212a is selected at 256: at 258 it takes the first few bytes of the file in the file buffer 204 and compares them at 260 with its stored Characteristic pattern 214a. If the output of the comparator 212a indicates that the bytes do not match the stored Characteristic pattern 214a, at 262 a "no" or non-match indication is sent to comparator selection at 256, which triggers iteration of steps 256 to 262 for the second comparator 212b. If non-match indications are received from all comparators 212, such iterations terminate: a "no more" instruction is then sent to the file buffer 204 providing for the file to be discarded at 264 and operation 250 of the content checker 116 terminates at 272.

If, on any iteration of the steps 256 to 262, the output of the comparator 212 selected on that iteration indicates that the first few bytes of the file in the file buffer 204 do in fact match the associated stored Characteristic pattern 214, then at 266 the associated full checker 216 takes the file from the file buffer 204 and applies a full content check to it. If at 268 the file is not acceptable, the module 206 outputs a "no" signal providing for the file to be discarded at 264 and operation 250 terminates at 272. If the file is in fact acceptable, the module 206 outputs a "yes" signal instructing the file sender 210 at 270 to move the file to the file store 110 of the protected system 104. Operation 250 then terminates at 272.

If the content checker 116 finds no match with a Characteristic pattern, the file either consists of data with an unknown format or is in a Headerless file format that starts with redundant data. If the format is unknown then the file can be rejected on the basis that its data does not serve any useful purpose. If it is in a Headerless format, the file can be rejected on the basis that it is too costly/time consuming to check. Moreover, the file's sender could have eliminated the redundant data with which the file begins to allow it to be checked, which permits an inference to be drawn that the sender is not interested in allowing the file to be checked.

However, the content checker 116 does not deal with the further problem of data which is polymorphic, i.e. Headerless data embedded either within a Characteristic Header file or within a Headerless file with a different format to the embedded Headerless data. Because the embedded Headerless data is not at the start of the file, a conventional checker 116 will not identify it and so will not check whether or not it is fit to admit to a sensitive computer system.

Figure 5:
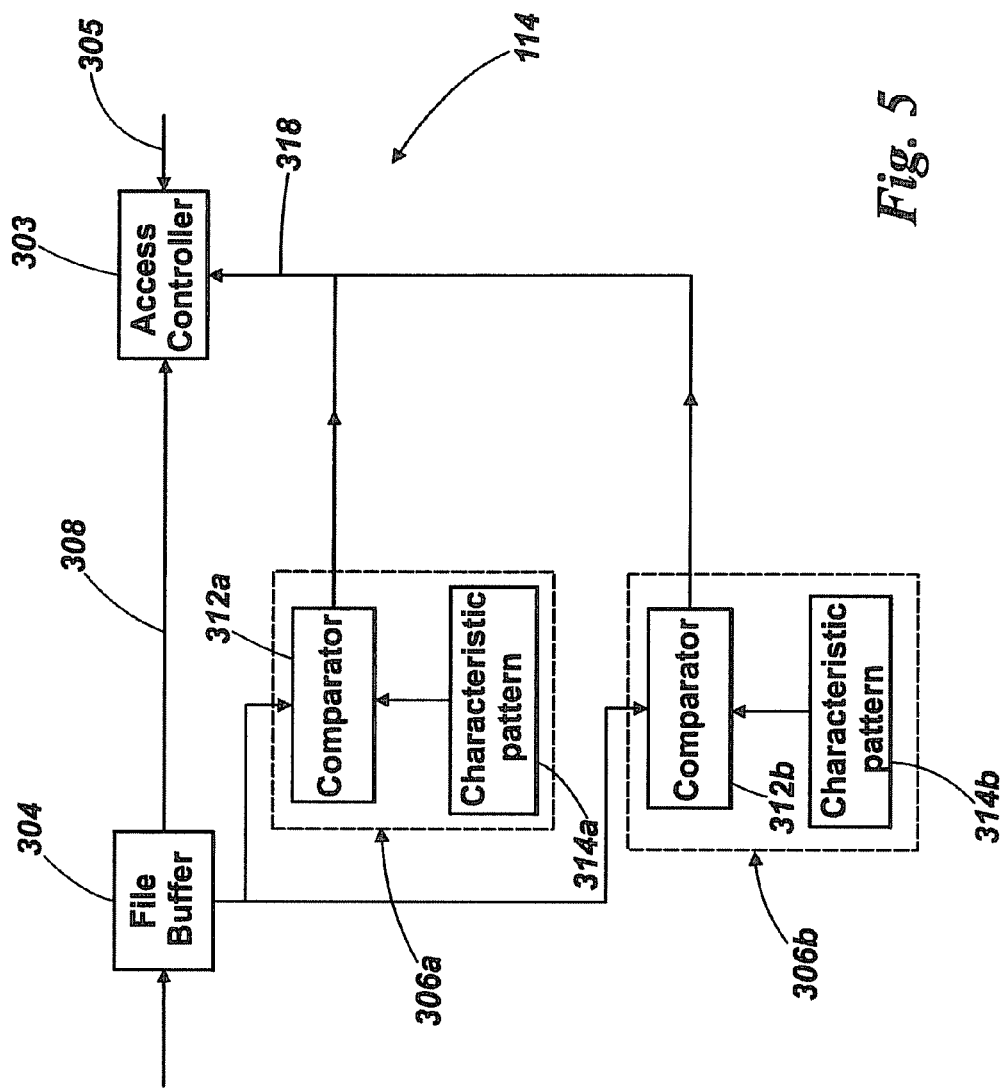
FIG. 5 is a block diagram of access check functionality incorporated in FIG. 2.

Referring to FIG. 2 once more, and now also to FIG. 5, the access check function 114 is shown in more detail in the latter.

The access check function 114 has some similarities to the content checker 116 shown in FIG. 3, equivalent parts being like-referenced with a prefix 300 replacing 200. The access check function 114 has an access controller 303, which has an input 305 for receiving requests from the application 106 to read a file: when such a read request is received, the controller 303 copies the file from the file store 110 into a file buffer 304 connected to a number of content checker modules indicated collectively and generally by 306, of which two are illustrated as 306a and 306b within chain lines.

The purpose of the access check function 114 is to inspect a file's first few bytes for a Characteristic pattern indicating a file format suitable for processing by the application 106. In this embodiment the access check function 114 is not required to carry out a full content check of a file. The access check function 114 establishes whether or not a file starts with a suitable Characteristic pattern indicating a file format that is handled by the application 106. In particular, a file which starts with redundant data is not acceptable to the access check function 114; however that file might have been passed by the content checker 116 as a Headerless file format that is polymorphic with some Characteristic Header format that is not handled by the application 106.

A file in the file buffer 304 is examined by the content checker modules 306, each of which checks the first few bytes at the start of the file for the presence of its respective Characteristic pattern 314 indicating a file format that the application 106 is configured to process. Each content checker module 306 either does or does not generate a clearance signal to allow the application 106 to read the file depending upon whether or not the file begins with the respective Characteristic pattern associated with that module: if the file does begin with bytes having the Characteristic pattern associated with the respective content checker module 306, that module puts a clearance signal on a bus 318. The bus 318 is connected to the access controller 303, which communicates with the file buffer 304 via a line 308. On receipt of a clearance signal, the access controller 303 activates the file buffer 304 to make available a copy of the file to the application 106. If the file does not begin with bytes having a Characteristic pattern associated with any of the content checker modules 306, no clearance signal appears on the bus 318 and the application 106 is consequently denied access to the file by the access controller 303.

The content checker modules 306 contain respective comparators 312 and stored Characteristic patterns 314: these are arranged to check for Characteristic patterns in files' first few bytes. The comparators 312 and stored Characteristic patterns 314 operate as described for their equivalent parts 212 and 214 shown in FIG. 3.

Figure 6:
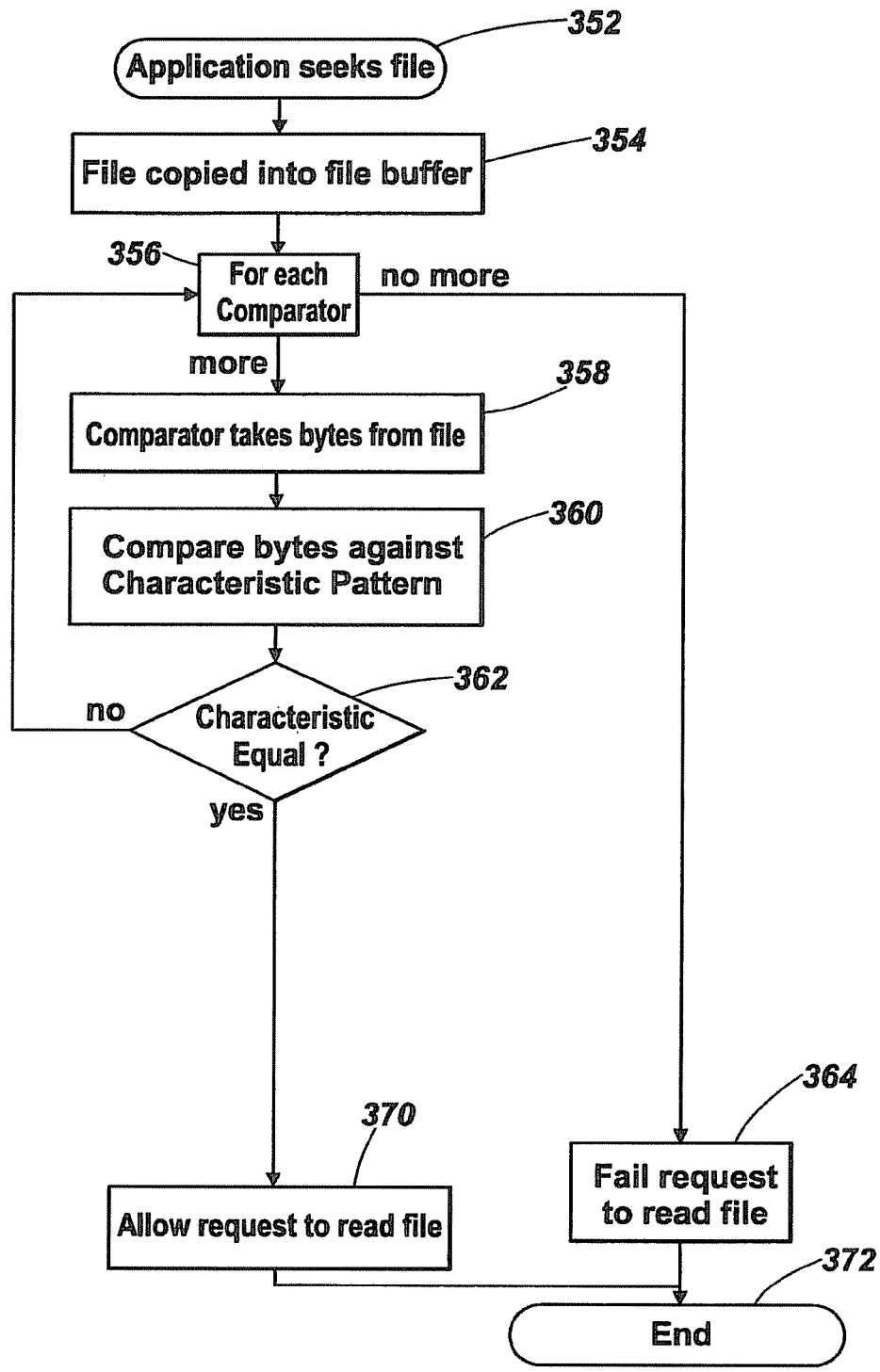
FIG. 6 is a flow diagram illustrating operation of the access check function of FIG. 5.

Referring now also to FIG. 6, a flow diagram shows the operation 350 of the access check function 114. The operation 350 of the access check function 114 is similar to steps 252 to 264 and 270 of the content checker 116 shown in FIG. 4, equivalent steps being like-referenced with a prefix 300 replacing 200 and "comparator" replacing "full checker". There is however an important difference in that the content checker 116 checks for all file types handled by the protected system 104, whereas the access check function 114 only checks for Characteristic patterns of file types handled by the application 106, and does not perform a full content check of the file in this embodiment. At 352, the application 106 opens a file, which at 354 results in the file being copied from the file store 110 to the file buffer 304. By iterating through steps 356 to 362 (similarly to steps 256 to 262 in FIG. 4), each content checker module 306 in turn attempts to match the file's first few bytes with its stored Characteristic pattern 314. If non-match indications are received for all comparators 312, a "no more" instruction is then sent to the access controller 303 at 364 providing for the application 106 to be denied access to read the file in the file buffer 304. Operation 350 of the access check function 114 then terminates at 372.

If, on any iteration of the steps 356 to 362, the output of the comparator 312 selected on that iteration indicates that the first few bytes of the file in the file buffer 304 do in fact match the associated stored Characteristic pattern 314, e.g. pattern c1 in FIG. 1 for a Headerless file format, then at 362 iterations terminate and the module 306 outputs a "yes" signal: this "yes" signal instructs the access controller 303 at 370 to allow the application 106 to read the file in the file buffer 304. Operation 350 of the access check function 114 then terminates at 372.

Although a file which the application 106 is allowed to read at 370 might be a polymorphic file, in this embodiment it must start with the Characteristic pattern of the format that the application 106 is going to use to interpret the file's data; moreover, the content checker 116 has already applied a full content check to the file as configured for the file format associated with the Characteristic pattern. If the file also has some other format, that format won't have been checked, but the application 106 will not open the file in a way which allows it to read data in that format and cannot be affected by it. This is particularly relevant to a file that is polymorphic with two different Headerless formats, an example of which is Zip and HTML: a Zip file may start with redundant data; the HTML specification says HTML documents should start with a Characteristic pattern, but in practice some implementations (i.e. Browsers) ignore this and will interpret data as HTML even if the appropriate Characteristic pattern is missing.

The access check function 114 provides a mechanism to intercept each file to be opened by the application 106, and to allow access only if the first few bytes of the file match the Characteristic pattern of bytes of the file format specification for which the application 106 is configured. In effect, this confirms one of the checks made by the content checker 116, but only for the file format or formats handled by the application 106: the check is repeated in case it was missed by the content checker 116, e.g. because a Headerless format was confused by some other format. For example, a polymorphic file having both JPEG and Zip characteristics will be allowed into the protected system 104 by the content checker 116, because it appears to be a JPEG file. A WinZip application would open such a file, but the access check function 114 would identify the file as not being a Zip with no initial redundant data, because it does not begin with PK (a characteristic of a Zip file). Consequently, the access check function 114 denies the file access by the application 106. Thus, if a polymorphic file enters the protected system 104 with unchecked internal Headerless data, the application 106 does not process that data. Because the access check function 114 only checks that a file starts with the right data, it does not need to scan an entire file looking for the start of Headerless data, which improves operating speed.

The embodiment of the invention described with reference to FIGS. 1 to 6 demonstrates how a computer system 104 can be protected even if only the first few bytes of a file are checked by the system to ascertain file type. Where Headerless file formats are used, the start of the file is checked for the format's Characteristic pattern: in effect this treats Headerless formats as Characteristic Header formats with different Characteristic patterns. Data is only allowed to enter a sensitive computer system if it is acceptable Characteristic Header format data or acceptable Headerless format data with no initial redundant data.

Figure 7:
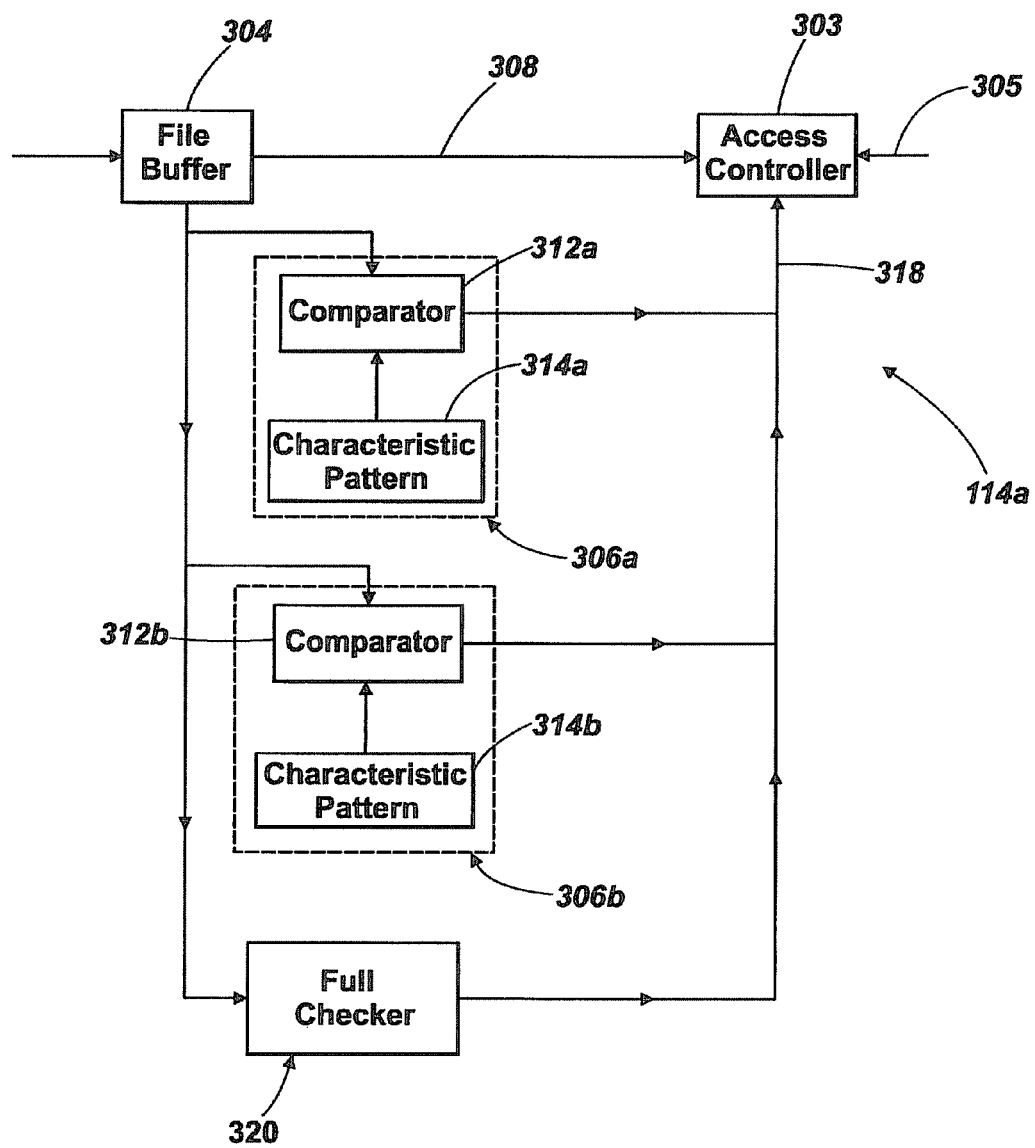
FIG. 7 is a block diagram of access check functionality augmented by a full content check.

In an alternative embodiment of the invention, rather than only a Characteristic pattern check, the access check function 114 may in addition carry out a full content check of all a file's data: this reduces "false positives", i.e. unnecessary blocking of valid files, but at the expense of additional processing time. It allows Headerless format files to be processed by the application 106 even if they start with redundant data, because it does not block such a file if the file is in other respects a valid file. This embodiment is referenced 114a in FIG. 7. Parts equivalent to those illustrated in FIG. 5 are like referenced.

The access check function 114a is equivalent to FIG. 5 with the addition of a full checker 320 of the kind referenced 216 in FIG. 3. Each content checker module 306 either does or does not now generate a clearance signal for an access controller 303 to allow the application 106 to read a file in a buffer 304 depending respectively on whether or not the file begins with the respective Characteristic pattern at 314 associated with the relevant module 306: e.g. one module 306a might be arranged to recognise a Characteristic Header and the other 306b a Zip file as (c) in FIG. 1 which does not begin with redundant data. If neither module 306 generates a clearance signal to allow the application 106 to read the file, the full checker 320 operates: i.e. the whole of the file in the file buffer 304 is examined by the full checker 320 to ascertain whether or not it is as e.g. (b) in FIG. 1, having a Characteristic pattern which follows redundant data. The full checker 320 may in fact check for more than one file type, as the application 106 might handle more than one type of Headerless file. In other respects the access check function 114a is constructed and operates as described earlier for relevant parts of FIGS. 3 and 5.

The full content check deals with two cases of a file with Headerless format. The first case is where the file starts with redundant data and was generated internally within the system and hence has not passed through content checker 116. The second case is where the file is imported from outside the system and the file begins with data that matches a second format not handled by the application 106: such a file is polymorphic with two formats, the Headerless format handled by the application 106 in addition to the second format. If the file passes the full content check, the access check function 114 allows the application 106 to have access to the file in order to open and process it; if the file fails the applied checks, the application 106 is denied access to it. This embodiment of the invention requires a full content check of all a Headerless file's data to be applied every time the file is requested by the application 106.

To summarise, three embodiments of the invention are described above with differing degrees of checking. In one embodiment, a Characteristic Header file is only admitted into a protected system after checking for acceptability; this embodiment has an additional check to avoid the situation of a polymorphic file with both Characteristic Header and Headerless formats being admitted into a protected system on the basis of its Characteristic Header format, but being opened by an application configured for the Headerless format. The additional check stops an application opening a Headerless format file that starts with redundant data: e.g. a Zip file may or may not begin with redundant data, and those that do not (which are in the majority) consequently begin with the Zip Characteristic pattern. This embodiment allows a Zip file beginning with redundant data that matches some other format to be admitted into a protected computer system but will not allow the file to be opened as a Zip file, i.e. with Headerless format. It also allows a file beginning with the Zip characteristic to be admitted into a protected computer system and to be opened, but only after the Zip characteristic at the start of the file has been checked twice.

The second embodiment has the added refinement that a file which begins with redundant data and is admitted into a protected computer system is subjected to a full content check relevant to the file type in response to detection of the redundant data. For example, a general Zip file which starts with redundant data and which is polymorphic with some additional known format is subjected to a search through the file's entire contents to find Zip characteristic data, whereupon that data is checked for validity. In this embodiment a full content check of the file is carried out, once by an external content checker 116 against a Characteristic Header format and once against a Headerless format by an access check function 114 which controls access to an application running on a protected computer system. In this embodiment, the full check will also be applied to any Headerless format files starting with redundant data that are created inside the system 104, thus reducing the number of "false-positive" indications where acceptable files are not opened.

The third embodiment allows Headerless files to enter a protected computer system, even when they are not polymorphic files. In this embodiment the content checker 116 is modified to allow a file which does not begin with a recognised Characteristic pattern to gain entry into a protected computer system 104 without checking the file's contents fully. For example, a general non-polymorphic Zip file, which begins with redundant data, is allowed to gain entry. However, a file which does not begin with a recognised Characteristic pattern is not recognised by the content checker 116, which consequently cannot check the file for content. If such a file is to be opened, it needs to be checked and this is the purpose of the access check 114. The access check function 114 is modified to discover the absence of a Characteristic pattern at the beginning of the file and respond by searching through the file contents for that pattern: it discovers the Characteristic pattern after passing over the redundant data with which the file begins, and then carries out a full check of the file's contents. If the Characteristic pattern indicates an appropriate file type for the application 106, e.g. a Zip file for a WinZip application, the access check function 114 allows the application 106 access to it.

It does not affect the situation if the file is also polymorphic as at (d) in FIG. 1, with its redundant data incorporating a Characteristic pattern d1 in its leading redundant data d1 and d2 which the content checker 116 does not recognise. This is because the access check function 114 will ignore the redundant data and pass to the Characteristic pattern d3, and the application 106 will process the file's data d4 in accordance with the file type associated with the pattern d3: e.g. if the Characteristic pattern d3 indicates a Zip file, a WinZip application will process its Zip data d4 as such and ignore/treat as redundant leading data d1 and d2 and following data d5 and d6. This procedure is time consuming, and a user has to wait to open such a file; it does however have the advantage of being able to deal with ZIP files and the like starting with redundant data, i.e. so long as the file does not also have some other file format that is deemed potentially damaging and which the external content checker 116 will therefore block from entry into the computer system 104.

The external content checker 116 is implemented using techniques of firewalls and application level protocol proxies that are well known in the art of computer systems, and will not be described further. In addition, checks implemented by the access check function 114 or 114a are associated with applications, into which they may be inserted: the techniques for such insertion are also well known, though they vary in detail depending upon which operating system environment is used. For example, for Microsoft Windows, it is possible to introduce such checks by hooking interfaces that applications use to access an operating system's file store. New applications that handle Headerless files may be constructed so as to call the access check function directly.

The invention claimed is:

1. A method of protection of a computer system, the method comprising:
    (a) providing the computer system with an application for processing incoming files to the computer system of a predefined Headerless format that include a Characteristic pattern of bytes,
    (b) computing apparatus external to the computer system ascertaining a Characteristic pattern of bytes of an incoming file to the computing apparatus from bytes of the file,
    (c) the computing apparatus performing a content check on the incoming file to the computing apparatus to determine whether or not the file has contents that are malformed and therefore potentially damaging when interpreted in accordance with a file format specification associated with the ascertained Characteristic pattern of bytes,
    (d) the computing apparatus moving the file to the computer system if the file is not determined to have malformed content,
    (e) the computer system checking the incoming file to the computer system and having Headerless format by comparing bytes of the file with the Characteristic pattern of bytes of the predefined Headerless format, and
    (f) the computer system disallowing processing by the application if the bytes compared in step (e) with the Characteristic pattern of bytes of the predefined Headerless format do not correspond with that Characteristic pattern.

2. A method according to claim 1 wherein step (b) of ascertaining an incoming file's Characteristic pattern of bytes is implemented by comparing leading bytes of the file with each of a set of Characteristic patterns.

3. A method according to claim 1, wherein, following step (d) the file is stored in a file store.

4. A method according to claim 1 wherein step (e) involves comparing leading bytes of the incoming file with the Characteristic pattern of bytes of the predefined Headerless format.

5. A method according to claim 4 wherein step (f) involves the computer system disallowing processing by the application if the leading bytes of the incoming file to the computer system do not correspond with the Characteristic pattern of bytes of the predefined Headerless format.

6. A method according to claim 4 wherein if the leading bytes of the incoming file do not correspond with the Characteristic pattern of bytes of the predefined Headerless format the step (e1) is performed which involves determining whether bytes of the incoming file that are not located at the beginning of the file correspond with the Characteristic pattern of bytes of the predefined Headerless format.

7. A method according to claim 6 wherein step (f) involves the computer system disallowing processing by the application if no bytes of the incoming file to the computer system correspond with the Characteristic pattern of bytes of the predefined Headerless format.

8. A method of protection of a computer system, the method having the steps of:
    (a) providing the computer system with an application for processing incoming files to the computer system of a predefined Headerless format that include a Characteristic pattern of bytes not located at the beginning of the file,
    (b) computing apparatus external to the computer system moving a file received by the computing apparatus to the computer system if the file does not begin with a Characteristic pattern of bytes,
    (c) the computer system checking for the Characteristic pattern of bytes of the predefined Headerless format in an incoming file to the computer system, and
    (d) the computer system disallowing processing by the application if the incoming file to the computer system does not include the Characteristic pattern of bytes of the predefined Headerless format in a file location that is not at the beginning of the file.

9. Apparatus comprising:
    a computer system provided with an application for processing incoming files to the computer system of a predefined Headless format that include a Characteristic pattern of bytes,
    computing apparatus external to the computer system configured to:
        i. ascertain a Characteristic pattern of bytes of an incoming file to the computing apparatus from bytes of the file,
        ii. perform a content check on the incoming file to the computing apparatus to determine whether or not the file has contents that are malformed and therefore potentially damaging when interpreted in accordance with a file format specification associated with the ascertained Characteristic pattern of bytes, and
        iii. move the file to the computer system if the file is not determined to have malformed content,
    wherein the computer system is configured to:
        i. check an incoming file to the computer system and having Headerless format by comparing bytes of the file with the Characteristic pattern of bytes of the predefined Headerless format, and
        ii. disallow processing by the application if the bytes compared with the Characteristic pattern of bytes of the predefined Headerless format do not correspond with that Characteristic pattern.

10. Apparatus according to claim 9 wherein the computing apparatus is configured to ascertain an incoming file's Characteristic pattern of bytes by comparing leading bytes of the file with each of a set of Characteristic patterns.

11. Apparatus according to claim 9 wherein the computer system is configured to check an incoming file to the computer system by comparing leading bytes of the incoming file with the Characteristic pattern of bytes of the predefined Headerless format.

12. Apparatus according to claim 11 wherein the computer system is configured to disallow processing by the application if the leading bytes of the incoming file to the computer system do not correspond with the Characteristic pattern of bytes of the predefined Headerless format.

13. Apparatus according to claim 11 wherein if the leading bytes of the incoming file do not correspond with the Characteristic pattern of bytes of the predefined Headerless format then the computer system is configured to determine whether bytes of the incoming file that are not located at the beginning of the file correspond with the Characteristic pattern of bytes of the predefined Headerless format.

14. Apparatus according to claim 13 wherein the computer system is configured to disallow processing by the application if no bytes of the incoming file to the computer system correspond with the Characteristic pattern of bytes of the predefined Headerless format.

15. Apparatus comprising:
- a. a computer system provided with an application for processing incoming files to the computer system of a predefined Headerless format that include a Characteristic pattern of bytes not located at the beginning of the file,
- b. computing apparatus external to the computer system configured to move a file received by the computing apparatus to the computer system if the file does not begin with a Characteristic pattern of bytes, wherein the computer system is configured to:
- i. check for the Characteristic pattern of bytes of the predefined Headerless format in an incoming file to the computer system, and
- ii. disallow processing by the application if the incoming file to the computer system does not include the Characteristic pattern of bytes of the predefined Headerless format in a file location that is not at the beginning of the file.

16. A non-transitory computer readable storage medium having stored thereon computer-readable instructions which when executed by apparatus according to claim 15 causes the apparatus to perform a method comprising:
- (a) the computing apparatus external to the computer system moving a file received by the computing apparatus to the computer system if the file does not begin with a Characteristic pattern of bytes,
- (b) the computer system checking for the Characteristic pattern of bytes of the predefined Headerless format in an incoming file to the computer system, and
- (c) the computer system disallowing processing by the application if the incoming file to the computer system does not include the Characteristic pattern of bytes of the predefined Headerless format in a file location that is not at the beginning of the file.

17. A non-transitory computer readable storage medium having stored thereon computer-readable instructions which when executed by apparatus according to claim 9 causes the apparatus to perform a method comprising:
- (a) the computing apparatus external to the computer system ascertaining a Characteristic pattern of bytes of an incoming file to the computing apparatus from bytes of the file,
- (b) the computing apparatus performing a content check on the incoming file to the computing apparatus to determine whether or not the file has contents that are malformed and therefore potentially damaging when interpreted in accordance with a file format specification associated with the ascertained Characteristic pattern of bytes,
- (c) the computing apparatus moving the file to the computer system if the file is not determined to have malformed content,
- (d) the computer system checking the incoming file to the computer system and having Headerless format by comparing bytes of the file with the Characteristic pattern of bytes of the predefined Headerless format, and
- (e) the computer system disallowing processing by the application if the bytes compared in step (d) with the Characteristic pattern of bytes of the predefined Headerless format do not correspond with that Characteristic pattern.

18. A non-transitory computer readable storage medium of claim 17 wherein step (a) of ascertaining an incoming file's Characteristic pattern of bytes is implemented by comparing leading bytes of the file with each of a set of Characteristic patterns.

19. A non-transitory computer readable storage medium according to claim 17 wherein step (d) involves comparing leading bytes of the incoming file with the Characteristic pattern of bytes of the predefined Headerless format.

20. A non-transitory computer readable storage medium according to claim 19 wherein step (e) involves the computer system disallowing processing by the application if the leading bytes of the incoming file to the computer system do not correspond with the Characteristic pattern of bytes of the predefined Headerless format.

21. A non-transitory computer readable storage medium according to claim 19 wherein if the leading bytes of the incoming file do not correspond with the Characteristic pattern of bytes of the predefined Headerless format then step (d1) is performed which involves determining whether bytes of the incoming file that are not located at the beginning of the file correspond with the Characteristic pattern of bytes of the predefined Headerless format.

22. A non-transitory computer readable storage medium according to claim 21 wherein step (e) involves the computer system disallowing processing by the application if no bytes of the incoming file to the computer system correspond with the Characteristic pattern of bytes of the predefined Headerless format.

* * * * *